(12) United States Patent
Kewitsch

(10) Patent No.: US 11,320,612 B2
(45) Date of Patent: May 3, 2022

(54) LOW LOSS OPTICAL MONITORS, OPTICAL MONITOR ARRAYS AND OPTICAL MONITOR PATCH-PANELS

(71) Applicant: Telescent Inc., Irvine, CA (US)

(72) Inventor: Anthony Stephen Kewitsch, Santa Monica, CA (US)

(73) Assignee: Telescent Inc., Irvine, CA (US)

(*) Notice: Subject to any disclaimer, the term of this patent is extended or adjusted under 35 U.S.C. 154(b) by 184 days.

(21) Appl. No.: 16/503,963

(22) Filed: Jul. 5, 2019

(65) Prior Publication Data

US 2020/0003978 A1 Jan. 2, 2020

Related U.S. Application Data

(63) Continuation of application No. PCT/US2018/053653, filed on Sep. 29, 2018.

(60) Provisional application No. 62/566,400, filed on Sep. 30, 2017.

(51) Int. Cl.
*G02B 6/42* (2006.01)
*G02B 6/02* (2006.01)
*H04B 10/079* (2013.01)

(52) U.S. Cl.
CPC .......... *G02B 6/4286* (2013.01); *G02B 6/02* (2013.01); *G02B 6/4287* (2013.01); *H04B 10/079* (2013.01)

(58) Field of Classification Search
CPC ... G02B 6/4286; G02B 6/4291; G02B 6/4287
See application file for complete search history.

(56) References Cited

U.S. PATENT DOCUMENTS

| 4,103,154 | A | 7/1978 | d'Auria et al. |
| 6,744,948 | B1 | 6/2004 | Pi et al. |
| 7,289,197 | B2 | 10/2007 | Kewitsch |
| 7,315,681 | B2 | 1/2008 | Kewitsch |
| 7,412,137 | B2 * | 8/2008 | Suzuki ............ G02B 6/4214 385/39 |
| 7,460,753 | B2 | 12/2008 | Kewitsch |
| 7,665,901 | B2 | 2/2010 | Kewitsch |
| 7,920,764 | B2 | 4/2011 | Kewitsch |
| 8,068,715 | B2 | 11/2011 | Kewitsch |
| 8,150,227 | B2 | 4/2012 | Kewitsch |
| 8,428,405 | B2 | 4/2013 | Kewitsch |

(Continued)

FOREIGN PATENT DOCUMENTS

GB 2021806 A * 12/1979 ........... G02B 6/4246

OTHER PUBLICATIONS

PCT, International Search Report for International Application No. PCT/US2018/053653 (dated Jan. 29, 2019).

(Continued)

*Primary Examiner* — Omar R Rojas
(74) *Attorney, Agent, or Firm* — Siritzky Law, PLLC

(57) ABSTRACT

Apparatus and devices to monitor optical power within optical fibers in a substantially non-invasive fashion are disclosed. Optical monitors are comprised of low leakage junctions within very compact optical junctions which each confine the leakage within a very small local volume but also include photodiode means to ascertain signal amplitude. Multiplexing circuits for different groupings of lines enables automated monitoring of optical status across a communication network.

20 Claims, 10 Drawing Sheets

(56) References Cited

U.S. PATENT DOCUMENTS

| | | |
|---|---|---|
| 8,463,091 B2 | 6/2013 | Kewitsch |
| 8,480,310 B2 | 7/2013 | Kewitsch |
| 8,488,938 B2 | 7/2013 | Kewitsch et al. |
| 8,554,033 B2 | 10/2013 | Kewitsch |
| 8,805,155 B2 | 8/2014 | Kewitsch |
| 9,052,465 B2 | 6/2015 | Kewitsch |
| 9,052,490 B2 | 6/2015 | Kewitsch |
| 9,110,249 B2 | 8/2015 | Kewitsch |
| 9,188,748 B2 | 11/2015 | Kewitsch |
| 9,411,108 B2 | 8/2016 | Kewitsch |
| 9,703,060 B2 | 7/2017 | Kewitsch |
| 10,042,122 B2 | 8/2018 | Kewitsch |
| 10,345,526 B2 | 7/2019 | Kewitsch et al. |
| 10,649,149 B2 | 5/2020 | Kewitsch |
| 10,895,691 B2 | 1/2021 | Kewitsch |
| 10,977,458 B2 | 4/2021 | Kewitsch |
| 2006/0157724 A1* | 7/2006 | Fujita .................. B29C 39/10 257/99 |
| 2012/0253153 A1* | 10/2012 | Trumble ............ A61B 5/14551 600/324 |
| 2013/0020474 A1* | 1/2013 | Miyauchi ........... G02B 6/02085 250/227.11 |
| 2016/0359289 A1* | 12/2016 | Kashiwagi ........... H01S 3/0014 |
| 2019/0293875 A1 | 9/2019 | Kewitsch |
| 2020/0003978 A1 | 1/2020 | Kewitsch |
| 2020/0041725 A1 | 2/2020 | Kewitsch |
| 2020/0358277 A1 | 11/2020 | Kewitsch |
| 2020/0359117 A1 | 11/2020 | Kewitsch |
| 2021/0072483 A1 | 3/2021 | Kewitsch et al. |

OTHER PUBLICATIONS

PCT, Written Opinion of the International Searching Authority for International Application No. PCT/US2018/053653 dated Jan. 29, 2019).

PCT, International Preliminary Report on Patentability for International Application No. PCT/US2018/053653 (dated Mar. 31, 2020).

EPO, European search opinion, for/in European Patent Application No. 18860930.9, dated Aug. 4, 2021 (6, pgs.).

EPO, Supplementary European search report, for/in European Patent Application No. 18860930.9, dated Aug. 4, 2021 (4, pgs.).

EPO, Communication regarding the transmission of the European search report, for/in European Patent Application No. 18860930.9, dated Aug. 4, 2021 (1, pgs.).

EPO, Partial European search report, for/in European Patent Application No. 18860930.9, dated May 4, 2021 (5, pgs.).

EPO, Provisional opinion accompanying the partial search results, for/in European Patent Application No. 18860930.9, dated May 4, 2021 (6, pgs.).

* cited by examiner

LOW LOSS OPTICAL MONITORS, OPTICAL MONITOR ARRAYS AND OPTICAL MONITOR PATCH-PANELS

REFERENCE TO RELATED APPLICATIONS

This application is a continuation of application no. PCT/US2018/053653, filed Sep. 29, 2018, which is based on U.S. provisional patent application No. 62/566,400 filed on Sep. 30, 2017, the entire contents of both of which are hereby fully incorporated herein by reference in its entirety for all purposes.

FIELD OF THE INVENTION

This invention relates to optical fibers and to systems comprised of fiber optic cables transmitting illumination and/or signals, and, more particularly, to devices and systems enabling distributed in-line measurements of optical power transmitted within fiber optic cables.

BACKGROUND

A wide range of optical detectors has been developed to detect visible and infrared illumination [Dereniak and Boreman, "Infrared Detectors and Systems", Wiley 1996]. Typical detectors for near infrared (800 to 1700 nm) wavelengths include photodiodes fabricated from InGaAs, GaAs, Ge or SiGe wafers with active areas ranging from 50 microns to 5 mm in diameter or width. In single mode and multi-mode fiber optic applications, these detectors require efficient collection optics to capture and focus a small fraction of light from the optical fiber core onto a photodiode active area.

In numerous fiber optic applications there is a need to tap a small fraction (e.g. from less than 1% to 10%) of the light from within the central optical fiber core having diameters of 5 to 62.5 microns, and direct it out of the fiber and onto an adjacent photodiode. This application requires low optical insertion loss (<0.5 dB) in transmission through the monitor, resulting in moderate sensitivity (1 µW) and relatively low bandwidth (kHz). Low insertion loss enables spatially distributed optical monitoring across large scale fiber optic communication networks, such that multiple passes through cascaded monitors does not compromise digital and/or analog optical signal quality.

Prior art fiber optic tap monitors typically incorporate a semiconductor photodiode integral with a fused tap coupler or a dual fiber collimating lens with a micro-optic beamsplitter which passes a small portion of the guided light onto a photodiode. For example, U.S. Patent Application No. 2009/0016716 by Isida describes a fiber array, tap coupler and photodetector integrated with a planar lightwave circuit. U.S. Patent Application No. 2009/0213363 by Starodubov et al. and U.S. Pat. No. 6,259,842 to Giltner disclose monitors that utilize one or more tap beam splitters and photodiodes. Alternatively, Shapiro et al. in U.S. Patent Application No. 2004/0022494 describe a monitor device in which a small amount of power is tapped off onto a photodiode by selective removal of the optical fiber's cladding. The referenced teachings do not, however, confront the need for compact sensors which are configurable in dense arrays and which introduce only minimal loss.

U.S. Pat. No. 9,535,218 to Zhao discloses an in-line fiber optic tap that eliminates the need for micro-bends and/or micro-reflectors formed on the fiber. An external optical light guide is disclosed, made of transparent material with index of refraction equal to or smaller than the index of refraction of the fiber cladding. The smaller index of refraction of the guiding element relative to the cladding introduces undesirable back-reflections within the cladding and degrades overall link performance.

A transmissive optical detector based on a photo-thermalelectric mechanism has been reported in U.S. Pat. No. 7,289,197, entitled "Transmissive Optical Detector", to A. S. Kewitsch. These detectors are slightly absorptive, passing the majority of the optical signal through without degradation, and utilize transparent conductive thin films such as indium tin oxide as the sensing element.

For next generation highly complex networks, there is a need for miniature, low loss, low cost measurements of optical power distributed across the network in order to support reliable operation of autonomous large-scale networks.

SUMMARY

The present invention is specified in the claims as well as in the below description. Preferred embodiments are particularly specified in the dependent claims and the description of various embodiments.

In general, without limitation, and according to exemplary embodiments hereof:

According to exemplary embodiments hereof, an optical power monitoring system is disclosed. The system may include low cost, miniature optical power monitoring assemblies, circuits and devices for support of fiber optic switching and interconnect systems, in which the system may controllably extract and detect a small fraction of light from within the core of an optical fiber. Extracted light samples may be confined within small volumes, including small individual photodiodes, and may be directed to photodetectors distributed throughout an organized sensor system for measurement.

In one exemplary embodiment, small fractions of light are leaked from each optical fiber at individual non-adiabatic junctions between abutting optical fiber segments along an optical path. The junctions, typically fusion splices, are configured to produce small (e.g. less than 1.0 dB) losses in the individual signals, such that the leakage signals are confined to their immediate areas and are also individually sensed by small proximate photodetectors (e.g., photodiodes). The photodetectors may convert the sensed light into electrical signals that may be used to determine or otherwise quantify the conditions of the optical signal paths in the fibers that may be monitored.

In some preferred implementations, the lossy interfaces may be encompassed by a small volume of material (e.g., a dome or cap) preferably of high index of refraction and shaped to direct the leaked light fraction onto the adjacent photodetectors. Preferably, the deliberately leaked light fraction is confined within the reflective dome or cap that may span the fiber junction to effectively reflect the leakage signal onto the photodetectors.

In accordance with exemplary embodiments hereof, the refractive indices and the geometries of the elements of the disclosed optical power monitoring system are interdependent but variable. By internally monitoring small fractions of each of the many signals being transmitted (e.g., within a network of fiber optic cables), the operating performance of the fiber optic network as a whole can be monitored. In addition, the In-line optical fiber power monitors may be varied in a number of ways. For example, in one exemplary embodiment hereof, the dome about the emitting portion of the lossy fiber junction may be augmented by an overlying reflective surface. Alternatively, the dome body immediately adjacent the lossy fiber surface may itself be covered by a low index of refraction encapsulant, such as silicone. Other configurations are also contemplated, preferably with the refractive indices of the adjacent elements selected to guide light emanating from the leakage junction in the cladding onto the active area of the photodetector substrate (of the photodiode). In addition, the signal reflecting structure can advantageously be configured with two separate but adjacent reflective dome segments for individually sensing oppositely directed signals in the same cable.

Combinations of such elemental optical fiber light monitors may be densely arrayed in relation to compact electronic processing circuits to provide multi-channel readouts and to monitor overall interconnection performance. For example, sets of monitors (preferably like sets) can be arrayed in multiplexed groups, and the sensors of each group may be scanned serially at a high rate to provide virtual immediate readouts of individual channel failures. In each multi-channel sensor group, for example, a temporal sample of the fractional signal then being extracted from each separate channel in the group may be sequentially multiplexed to an analog to digital converter circuit. The signal may then be processed and communicated to a network management system. This enables the then-current status of a changeable multiplicity of optical channels to be constantly and efficiently monitored in real, or near real, time. In addition, the specific channels monitored at any point in time may also be modified and controlled in real time as necessary.

Below is a list of optical power monitor embodiments. Those will be indicated with a letter "P".

P1. An optical power monitor comprising:
  at least one optical fiber with a lossy junction along its length and with a lengthwise cladding having a given index of refraction;
  transparent optical cement with index of refraction equal to or greater than that of the optical fiber cladding, positioned in contact with a selected side surface of said cladding, the optical cement being configured in a particular shape encompassing the lossy junction at the selected side thereof; and
  a photodiode body proximate the lossy junction on the side opposite the partial dome shape, wherein
  the particular shape directs a significant fraction of light from the lossy junction onto said photodiode body.

P2. The optical power monitor of embodiment P1, wherein the particular shape comprises a partial dome shape.

P3. The optical power monitor of any one of embodiments P1 or P2, the particular shape directs a significant fraction of light from the lossy junction onto said photodiode body through internal reflection.

P4. The optical power monitor of any one of embodiments P1 to P3 wherein the transparent optical cement is positioned in contact with the selected side surface of said cladding for a length of at least 0.5 mm.

P5. The optical power monitor of any one of embodiments P1 to P4, wherein the optical fiber has a single cladding.

P6. The optical power monitor of any one of embodiments P1 to P5, wherein the particular shape is covered with a highly reflective coating.

P7. The optical power monitor of embodiment P6, wherein the highly reflective coating is a gold coating or titanium white paint.

P8. The optical power monitor of any one of embodiments P1 to P7, wherein the lossy junction is fusion spliced.

P9. The optical power monitor of any one of embodiments P1 to P8, wherein the lossy junction is the interface between two optical fibers having different mode field diameters.

P10. The optical power monitor of any one of embodiments P1 to P9, wherein the photodiode has an active area with a length is at least 8 times the fiber cladding diameter.

Below is a list of device embodiments. Those will be indicated with a letter "D".

D11. A device to couple light out of an optical fiber cladding and onto a photodiode adjacent the optical fiber, the device comprising:
  a shaped optical polymer body with an index of refraction higher than that of the optical fiber cladding, the body having a surface within 10 degrees of the normal to the longitudinal optical axis of the optical fiber.

D12. The device of embodiment D11, wherein the optical polymer body comprises a partial dome shape.

D13. The device of any one of embodiments D11 or D12, wherein the photodiode is closely adjacent the optical fiber.

D14. The device of any one of embodiments D11 to D13, further comprising a reflective coating or paint applied to a top surface of the optical polymer body.

D15. The device of embodiment D14, further comprising a transparent cover to the shaped optical polymer body having an index of refraction less than or equal to 1.4.

D16. A low loss power monitor device for an optical fiber light transmission system comprising:
  a length of optical fiber transferring an optical signal within a core and cladding geometry, said length comprising serial segments engaged end to end by a lossy junction, wherein a fraction of the signal energy is deflected laterally thereat;
  a dome segment of higher index of refraction material than the optical fiber core encompassing the length of optical fiber including the lossy coupling on one side thereof and having a convex reflective surface positioned to reflect light from the lossy coupling back toward the second side of the fiber length; and
  a photodiode body positioned on the second side of the dome segment in contact with the span of fiber including the lossy junction and responsive to the light fraction reflected from the dome segment.

D17. The power monitor device of embodiment D16, wherein the segment comprises a dome segment.

D18. The power monitor device as set forth in any one of embodiments D16 to D17, wherein the lossy junction is a fusion device and the reflected light fraction loss is in the range of 0.1 dB to 1.0 dB.

D19. The power monitor device as set forth in any one of embodiments D16 to D18, wherein the segment has a bottom coextensive with a linear portion of the optical fiber length, and is in planar engagement with the adjacent photodiode body.

D20. The power monitor device as set forth in any one of embodiments D16 to D19, wherein the segment has a substantially flat bottom.

D21. The power monitor device as set forth in any one of embodiments D16 to D20, wherein the device comprises a highly reflective coating over the convex upper surface of the segment.

D22. The power monitor device as set forth in any one of embodiments D16 to D21, wherein the segment comprises UV cure optical cement and has a curvature providing relatively large angles of incidence for light internally reflected toward the photodiode.

Below is a list of system embodiments. Those will be indicated with a letter "S".

S23. A multi-channel optical system for ascertaining an operative status of individual optical circuits in a given multiplicity of different optical fiber circuits arranged in separated control paths, the system comprising:

separate individual signal extracting devices in each of said control paths, in separated segments of optical fibers, each fiber having a separate core junction excision laterally emitting less than above 1% of the signal conveyed along the fiber, each signal extracting device including an emission responsive photodiode body adjacent the junction on one side thereof, and photo-reflective means substantially encompassing the remainder of the junction and directing the laterally emitted signal onto the photodiode; and an optical signal multiplexer having at least one output and multiple inputs, each input separately receiving the signal input from a different one of the photodiodes, wherein absence of a signal in a control path indicates transmission failure.

S24. The system of embodiment S23, wherein the control paths comprise separated parallel control paths.

S25. The system of any one of embodiments S23 or S24, wherein the segments of optical fibers are laterally separated.

S26. The system of any one of embodiments S23 to S25, wherein the segments of optical fibers are laterally separated substantially parallel segments.

S27. The system of any one of embodiments S23 to S26, wherein the photo-reflective means comprises optical cement being configured in a particular shape.

S28. The system of embodiment S27, wherein the particular shape comprises a partial dome shape.

S29. The system of embodiments S27 or S28, wherein the particular shape is covered with a highly reflective coating.

S30. The system of embodiment S29, wherein the highly reflective coating is a gold coating or titanium white paint.

S31. The system of any one of embodiments S23 to S30, wherein the photo-reflective means comprises an optical energy reflector.

S32. The system of any one of embodiments S23 to S31, wherein the signal extracting devices comprise junctions between opposed optical fiber segment ends of less than 5 mm in length.

S33. The system of any one of embodiments S23 to S32, wherein the body enveloping each lateral junction is less than about 20 mm³ in volume.

S34. The system of embodiment S33, wherein the body enveloping each lateral junction comprises a higher refractive index on one side of the junction and a signal detecting photodiode on the other side of the junction.

S35. The system of embodiment S23, wherein the optical system further comprises a scanning system responsive to the signal multiplexer for and providing de-multiplexed output signals indicating the amplitudes of the individual signals from the different photodiodes.

S36. The system of embodiment S23, wherein the multiplexer has a single output.

S37. The system of any one of embodiments S23 to S36, wherein the optical system further comprises a scanning system responsive to the signal multiplexer providing de-multiplexed output signals indicating amplitudes of the individual signals from the different photodiodes.

S38. A circuit system for continuously monitoring power levels in individual ones of a plurality of optical fiber channels disposed in multi-channel sets, the system comprising:

a variable plurality of optical signal sensors, each positioned individually in a different one of the optical fiber channels, each signal sensor comprising a core discontinuity between abutting ends of paired optical fibers, each said discontinuity introducing less than about 1.0 dB of energy leakage loss in the signal being transmitted in the fiber, the signal sensors each also including individual optical energy reflectors spanning the core discontinuity on one lateral side of the fiber, and a signal detector spanning the core discontinuity on the opposite lateral side thereof to sense optical energy leaked therefrom; the multi-channel sets being substantially alike in number;

a plurality of different energy leakage signaling circuits, each coupled and responsive to the signals emanating from the separate sensors of a different one of the multi-channel sets and a scanner to serially scan the multiple sensors of the associated set to output the then-existing signal levels in the associated sets, each of the signaling circuits including a multiplexor to multiplex the sensors in the multi-channel sets; and a processor system coupled to control the scanning of the signaling circuits and to process one output from the sensing circuits.

S39. The system of embodiment S38, wherein the discontinuities along the fiber lengths each further comprise volumes defined by dome-shaped optical reflectors individually spanning one side of the core discontinuity and wherein said optical reflectors have a higher index of refraction within their dome-shaped volumes than the optical fiber cores and claddings, and the signal detectors each comprise a photodiode body providing an output signal responsive to the loss at the discontinuity.

The above features along with additional details of the invention are described further in the examples herein, which are intended to further illustrate the invention but are not intended to limit its scope in any way.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings is to scale unless specifically stated otherwise.

FIG. 1A and FIG. 1B depict side and top views respectively of a low loss optical tap power monitor device according to exemplary embodiments hereof, while

DETAILED DESCRIPTION OF THE PRESENTLY PREFERRED EXEMPLARY EMBODIMENTS

Figure 1A:
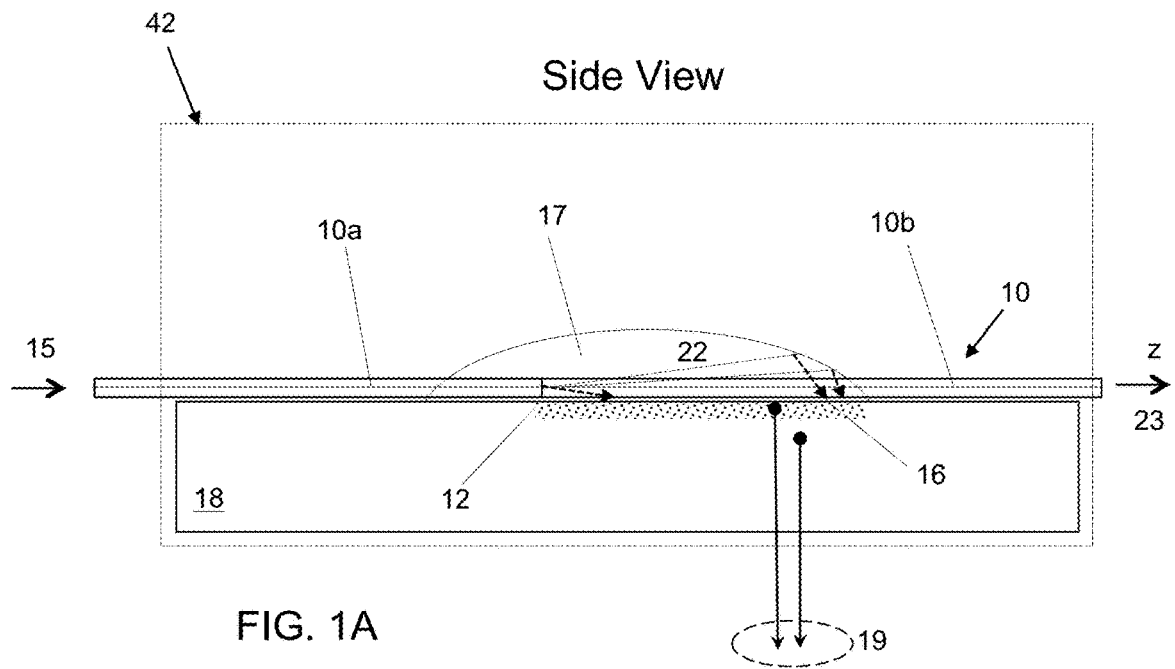

Devices and systems according to exemplary embodiments herein will be described in further detail with reference to the drawings.

With reference to FIGS. 1A-3B, a compact fiber optic monitor or monitoring device or assembly 42 (also referred to as an optical tap monitoring device) is responsive to optical signals in the range of selected near infrared wavelengths, including 850 nm, 1310 nm, and/or 1550 nm. Note that other wavelengths may also be monitored. The fiber optic monitor 42 may include a length of optical fiber 10 with demarcated spaced apart fiber segments 10a, 10b respectively, joined at an intermediate lossy and spliced junction 12. The segments here denoted "input" 10a and "output" 10b may be reversed, if desired, dependent on the system configuration. The lossy junction 12 between the abutting and joined ends of the fiber segments 10a and 10b is also seen in the expanded fragmentary views of FIGS. 2 and 3A-3B.

At the junction 12, a small but controlled amount of transverse leakage light 22 may exit the core 9 (FIG. 3A) and propagate through the optical fiber cladding 11 to the surrounding high index material. This leakage loss may be precisely controlled and is preferably in the range of 0.1 to 1 dB. This may result in the output optical signal 23 downstream of the lossy junction 12 to be 0.1 to 1 dB weaker than this input signal 15. The lossy junction 12 may alternatively be provided by fiber end couplings having dissimilar mode field diameters, non-normal cleave angles, partially diffused or offset cores, trapped bubbles, and the like, and/or any combination thereof.

An objective hereof is limited and controlled emission of light leakage 22 into the laterally adjacent volume and onto a photodiode active area 16.

Efficient confinement and measurement of the leakage light 22 emitted at the lossy junction 12, however, may require a compact and novel system combination and geometry. Accordingly, in exemplary embodiments hereof, the junction 12 may be encompassed by a reflector (e.g., a transparent dome 17 or cap) that may span the abutting lengths or segments 10a and 10b of fibers, and which encompass and defines the non-adiabatic lossy junction 12. The dome 17 may include a substantially planar lower surface that may generally encompass the length of the fiber segments/sections 10a and 10b, and may be somewhat asymmetrically positioned relative to the position of the junction 12. Forward signal emissions 22 at the lossy junction 12 predominantly propagate parallel and lateral to the fiber length and terminate at the photodiode 18 active area 16.

In exemplary embodiments hereof, the reflector 17 may include a parabolic shaped upper surface that may reflect the leakage light 22 onto the active area 16 of a photodetector substrate 18 that may be positioned below the dome 17. As shown in FIG. 1A, the leakage light 22 may reflect off the internal top surface of the dome 17 to be directed to the photodetector substrate 18. The photodetector substrate 18 may include photodiodes or other types of photo detecting devices that may make up the active area 16. In addition, while the photodetector substrate 18 is depicted as being positioned below the dome 17 and the fiber segments 10a, 10b, the photodetector substrate 18 may be positioned in any location and in any orientation with respect to the dome 17 and/or the fiber segments 10a, 10b, such that the photodetector substrate 18 may receive the leakage light 22.

While some (or most) of the light leakage from the lossy junction may be directed into the dome (e.g., along path 22) some portion of the leakage light 22 may propagate outward from the fiber 10 and terminate directly into the active area 16 of the photodetector substrate 18.

A second portion of the leakage light 22 may propagate laterally from the fiber 10, reflect off the interior volume of the dome 17 and be directed downward to the photodetector active area 16. The light 22 may then be collected by the photodetector substrate 18 and converted into an electrical signal 19 (e.g., a voltage or a current).

It should understood that while the above description describes the reflector 17 as encompassing the junction 12, thereby coming into physical contact with it, the dome 17 may also be partially or wholly separated from the junction 12 by a small distance (e.g., <1 mm). That is, there may be a small gap between the junction 12 and the reflector 17.

The material of the dome 17 that encompasses the junction 12 may be selected to have a relatively high optical index of refraction so that light 22 may be efficiently extracted from the lower index fiber cladding 11. This may prevent waveguiding of the leakage light 22 through the fiber cladding 11, which may occur if the surrounding dome material may have a lower index of refraction compared to the cladding 11. This type of waveguiding may diminish the efficiency in which the leakage light 22 may be absorbed by the photodetector substrate 18.

Figure 3A:
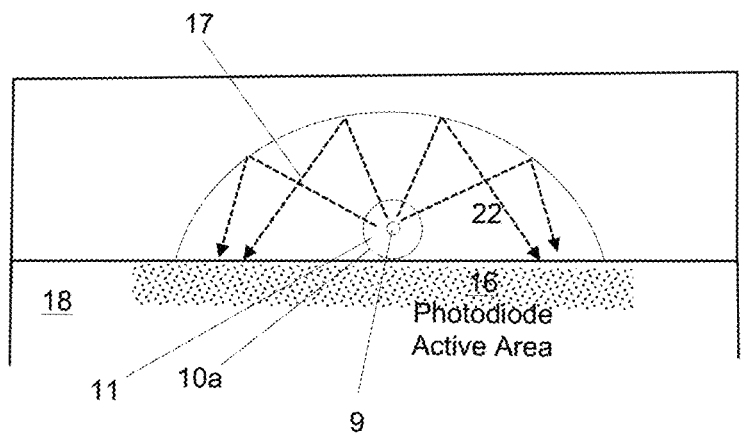
FIG. 3A is a detailed cutaway view of a transparent cement dome encasing and bonding the optical fiber to the top surface of a photodiode.

As illustrated in FIG. 3A, in an implementation, the dome 17 may include an optical cement material such as Norland NOA 86, with an index of refraction of 1.55. Other types of materials with other indexes of refraction may also be used. The dome 17 may be positioned above the surface of the adjacent (here underlying) photodiode 18, e.g., in the form of a small wafer segment or chip which spans the fiber 10 for a selected total length beyond each side of the junction 12. The light output 22 emitted laterally to the fiber lengths at the junction 12 may be efficiently coupled out from the cladding and onto the photodiode active area 16.

Figure 3B:
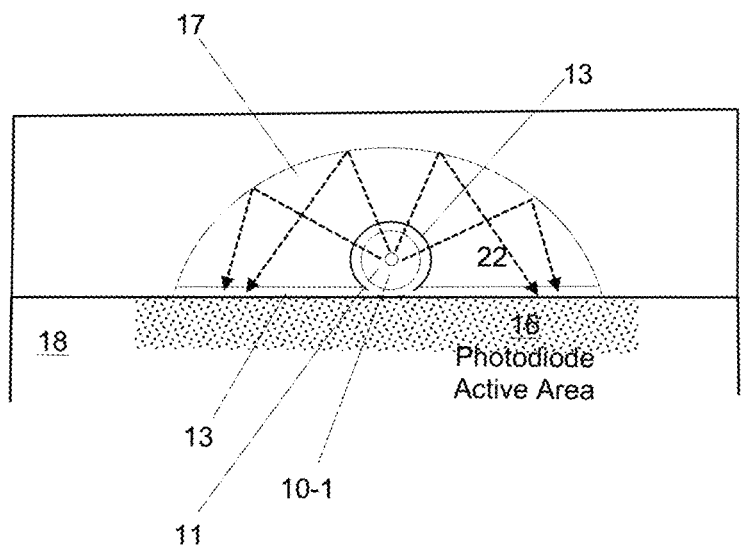
FIG. 3B is a detailed cutaway view of a molded dome, optical fiber and photodiode according to exemplary embodiments hereof.

In an alternative example, as shown in FIG. 3B, a transparent molded dome 17 may be bonded to the photodiode 18 with adhesive, and the light leakage 22 may pass through an intermediate transparent adhesive layer 13 having an index of refraction greater than that of the cladding 11 (e.g. above 1.45). More specifically, the interposed adhesive 13 may extend along a length of the lower surface of the fiber 10 and the proximate upper surface of the underlying photodiode substrate 18. Light leakage through the transparent adhesive 13 may thereby be efficiently coupled onto the active area 16 of the photodetector substrate 18 through total internal reflection at the curved interface of the high index dome 17.

Figure 1B:
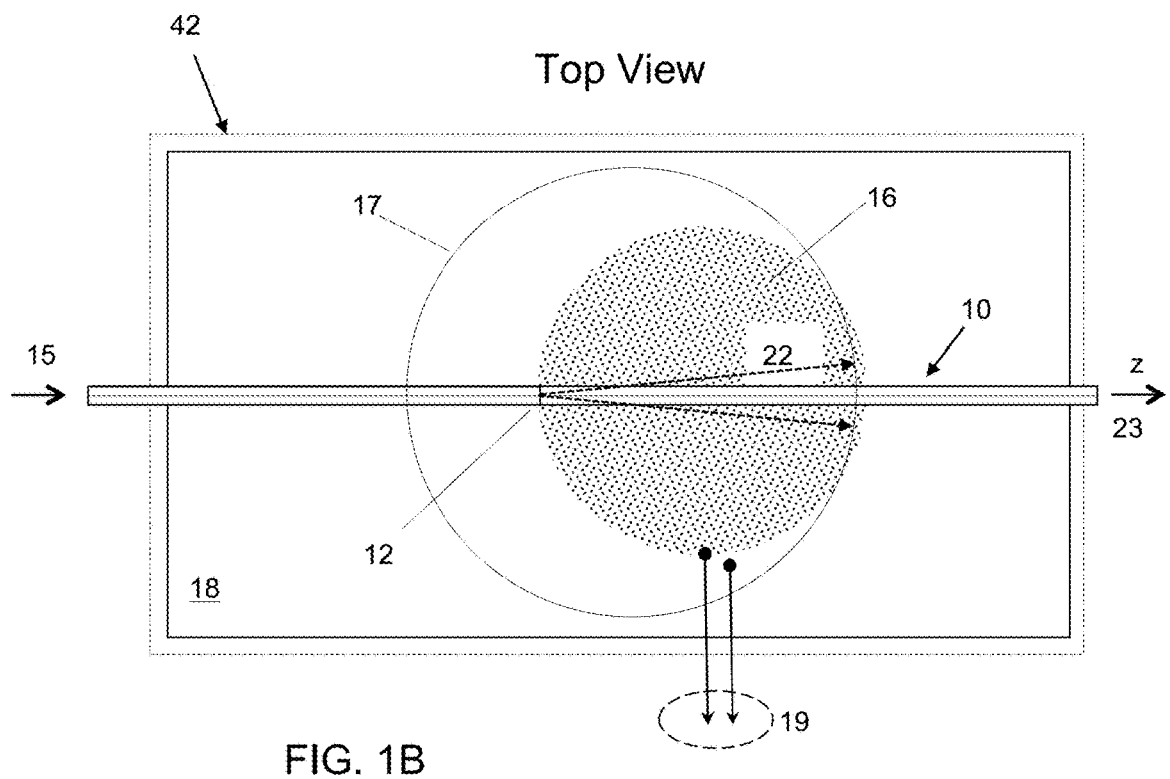

In the particular example shown in FIGS. 1A-1B, a small portion of the input optical signal 15 traveling in one direction, from input fiber segment 10a to output fiber segment 10b (e.g. uni-directional) may exit the core at the lossy junction 12 and may be substantially redirected by dome 17 and detected by the photodiode active area 16 in close proximity to the junction.

Figure 1C:
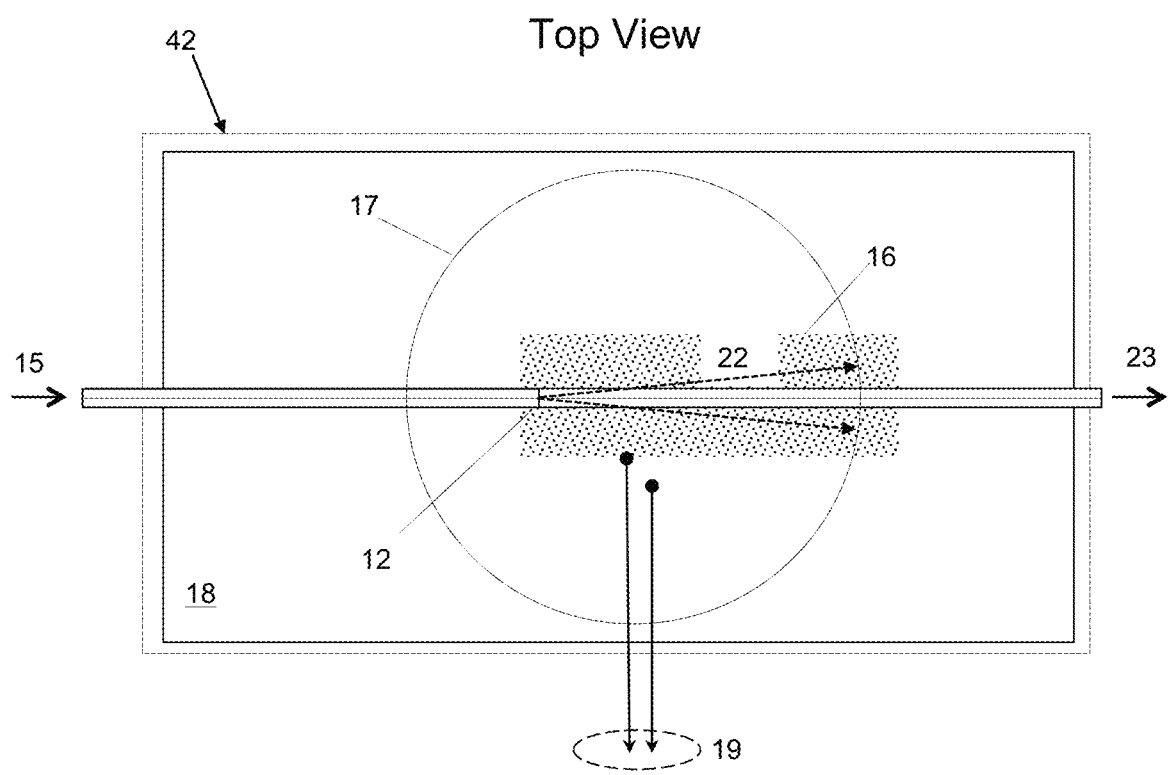
FIG. 1C is a top view of a similar photodetector but with a rectangular active area.
Figure 2:
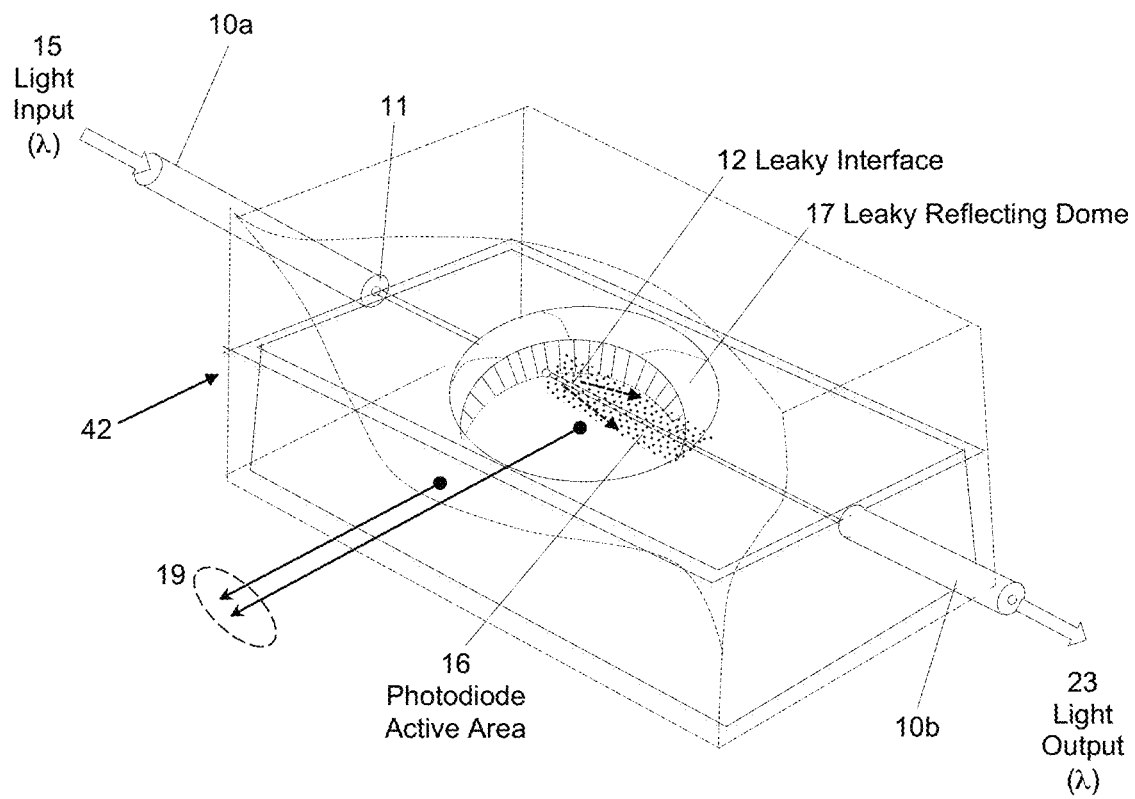
FIG. 2 is a perspective, cutaway view of the monitor device according to exemplary embodiments hereof.

FIG. 1B illustrates a circular active area 16 and FIG. 1C illustrates a rectangular active area 16. In general, the active area 16 may have an arbitrary shape such that a significant fraction (e.g. >0.5 or −3 dB) of outcoupled light 22 may be collected by the photodetector substrate 18 and converted to an electrical signal. Typically, an electrical current of 0.8 to 1 mA may be generated for every mW of optical leakage signal 22 incident on an InGaAs photodiode at near infrared wavelengths, but other levels of electrical current may also be generated by other types of solid-state materials.

For near infrared wavelengths such as 1310 nm and 1550 nm, the photodiodes may be fabricated from GaAs, InGaAs, InP, SiGe, or Germanium wafers, wafer segments, chips, dies, packages or any combination thereof. In addition, other materials and/or combinations of materials may also be used. Typical active areas of photodiodes may be 0.1 mm to 5 mm in width, so the detector element chip 18 may be similarly sized and compact. As seen in FIGS. 1A-1C, the photodiode substrate 18 may comprise a major portion of the volume of the elemental photodetector device 42 (e.g., the substrate 18 may extend substantially from the input of fiber segment 10a to the output of fiber segment 10b). Therefore, as disclosed hereafter, compact systems having multiple detectors totaling several orders of magnitude or more can be constructed using the devices disclosed herein. For detection at wavelengths of 850 nm or in the visible wavelength range, the photodetectors substrates 18 can be fabricated from a suitably doped wafer of Silicon or other materials.

Those of ordinary skill in the art will recognize that other variations of the device are feasible and are contemplated herein. For example, the splice/junction 12 joining the two fiber segments/sections 10a, 10b may be lossy due to one or more factors such as the two fibers having dissimilar mode field diameters, non-normal cleave angles, partially diffused or offset cores, trapped bubbles, etc. For example, the lossy, non-adiabatic junction 12 can be produced at the junction between two fibers with dissimilar mode field diameters and/or core offsets. For instance, Corning Clearcurve ZBL optical fiber has an 8.6 micron mode field diameter and Corning RC 1310 optical fiber has a 5.5 micron mode field diameter, and joining these two fibers may produce a loss at the junction of about 1 dB. In addition, the RC 1310 optical fiber has an 80-micron cladding diameter compared to the typical 125 micron cladding diameter of other fibers. Accordingly, use of this smaller 80 micron cladding diameter may also facilitate the coupling of light from the core into the cladding, and from the cladding onto a photodetector 18, since the core junction area may be closer to the proximate detector active area 16.

Figure 4:
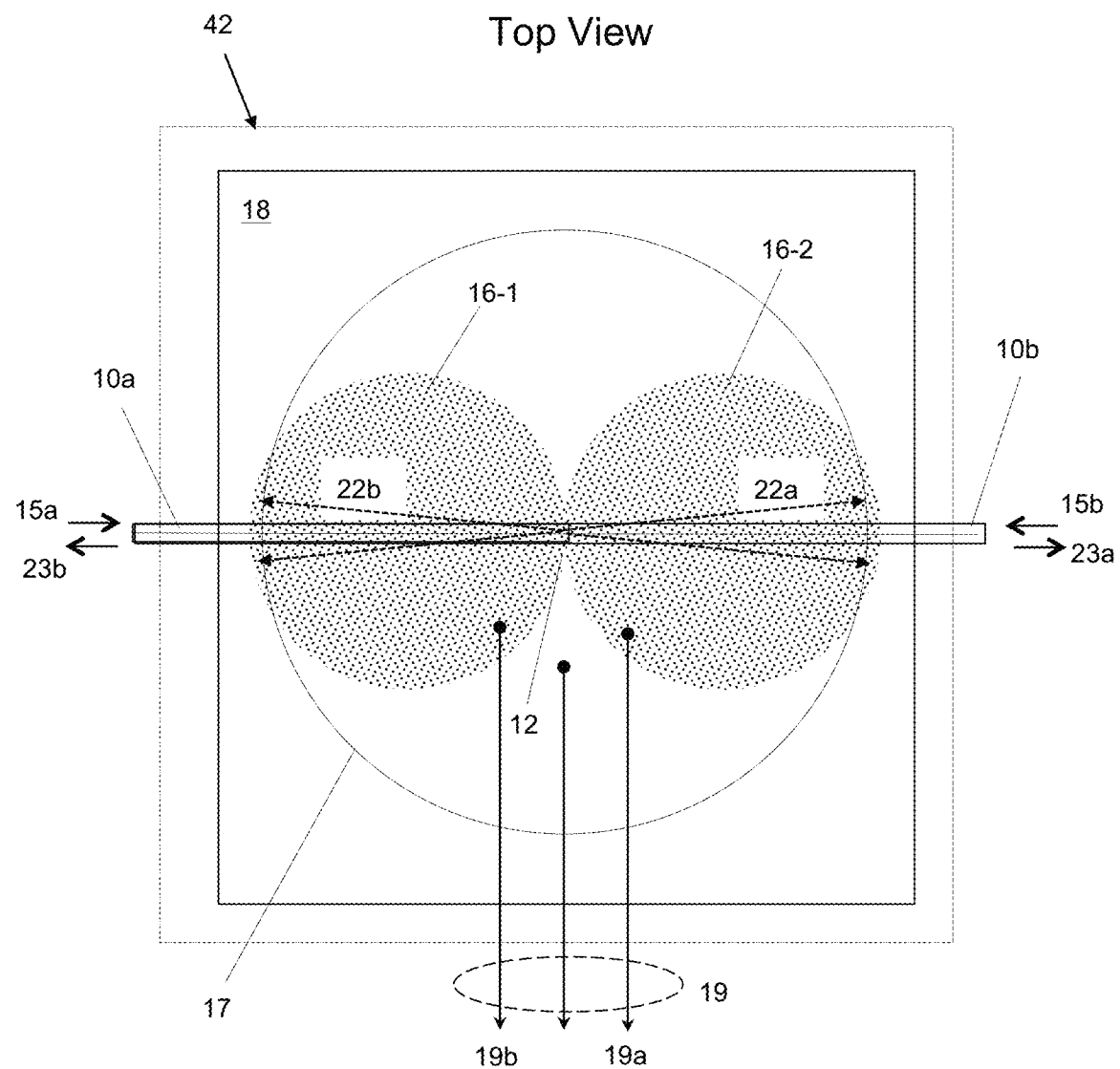
FIG. 4 illustrates a side view of a bidirectional in-line optical power monitor device according to exemplary embodiments hereof, to separately measure transmit (Tx) and receive (Rx) signals counter-propagating within same the core of a single fiber.

The in-line optical monitors disclosed are suitable for optical fibers carrying bidirectional signal transmission, as in the example of FIG. 4, to which reference is now made. As is known in the art, the term bidirectional may refer to distinct signals (e.g., signals 15a and 15b) that may be transmitted in opposite and opposing longitudinal directions within the same single optical fiber core 9. The dome 17 may be positioned adjacent to the common photodetector base 18, with two independent active areas 16-1 and 16-2, each with corresponding electrical signal outputs 19a, 19b, respectively. Forward and backward signal samples 22a, 22b may be separately detected to ascertain optical signal strength in both signal propagation directions. This dual detector approach may provide an added, more accurate means of ascertaining the optical fiber circuit operative status. Single point calibration of the detector may be necessary for high accuracy power measurements, to compensate for variation in coupling efficiency of each detector 42 due to one or more factors, including core offset variation, splice orientation variation, and dome geometry variation due to optical cement dispensing inconsistencies.

Alternatively, as shown in FIG. 4, separate and distinct bidirectional optical power measurements for light traveling in the same core of the fiber, but in opposite directions, may be performed. Input signal 15 has forward (15a) and backward (15b) components, and output signal 23 has forward (23b) and backward (23a) components. This is the case of bidirectional transmission in a single fiber in which Tx and Rx signals share the same optical fiber core 10. The light 22 leaks out of the core at the non-adiabatic (e.g. abrupt) fiber core discontinuity (junction) 12 in forward (22a) and backward (22b) directions. Dashed lines represent the light rays 22 escaping from the optical fiber, some light rays propagating straight to the photodiode, while other rays reflect off the far end of the reflective, transparent cap onto the photodiode active area 16 below.

With the lossy core interface/junction 12 generally longitudinally centered and the optical fibers substantially parallel to the surface of the photodiode active areas (e.g. two regions 16-1, 16-2 that are >1 mm in diameter or instead in elongated, rectangular dimension), the optical signals in both directions traveling through the same fiber (FIG. 4) may be independently detected. Leakage signal 22a may be directed onto and absorbed within active area 16-2, and leakage signal 22b may be directed onto and absorbed within active area 16-1. In one preferred implementation, the active areas 16-1, 16-2 may be generally circular and >1 mm in diameter. In another preferred implementation, the areas 16-1, 16-2 may be square, rectangular, elongated, or arranged in any shape, preferably with similar dimensions.

The dome 17 material may be optical cement (for example Norland NOA86 with 1.45 to 1.55 optical index of refraction), or injection molded plastic (e.g., transparent polycarbonate) or other materials. The dome 17 may be formed on or otherwise attached to the surface of the photodetector active areas 16-1 and 16-2. The light 22 coupled out of junction 12 may typically be a fraction (0.1 to 1 dB) of the light 15 propagating through the junction. This light 22 may be efficiently removed from the cladding 11 of the fiber so that it enters the material surrounding the fiber cladding with minimal reflections.

Ideally, the index of refraction of the dome material should match the index of refraction of the optical fiber cladding (~1.45) to eliminate reflections at the fiber cladding/dome/photodetector interfaces. By bonding the fiber downstream from the lossy junction 12 with transparent adhesive 13 onto the surface of a photodetector substrate 18, the light leakage 22 may be efficiently coupled onto the active area 16 of the substrate 18 below. The active area 16 of the photodetector substrate 18 may be reduced in area to a narrow rectangle, or other elongated and generally narrow shape, thereby reducing the cost of the substrate 18 by reducing (or minimizing) the size of its substrate.

This dual detector approach provides an added, more accurate means of ascertaining the operative status of an optical fiber circuit. Single point calibration of the detector may be necessary for high accuracy power measurements, to compensate for variations in the coupling efficiency of each detector 42 due to one or more factors, including but not limited to: core offset variation, splice orientation variation, and dome geometry variation due to optical cement dispensing inconsistencies.

Figure 5A:
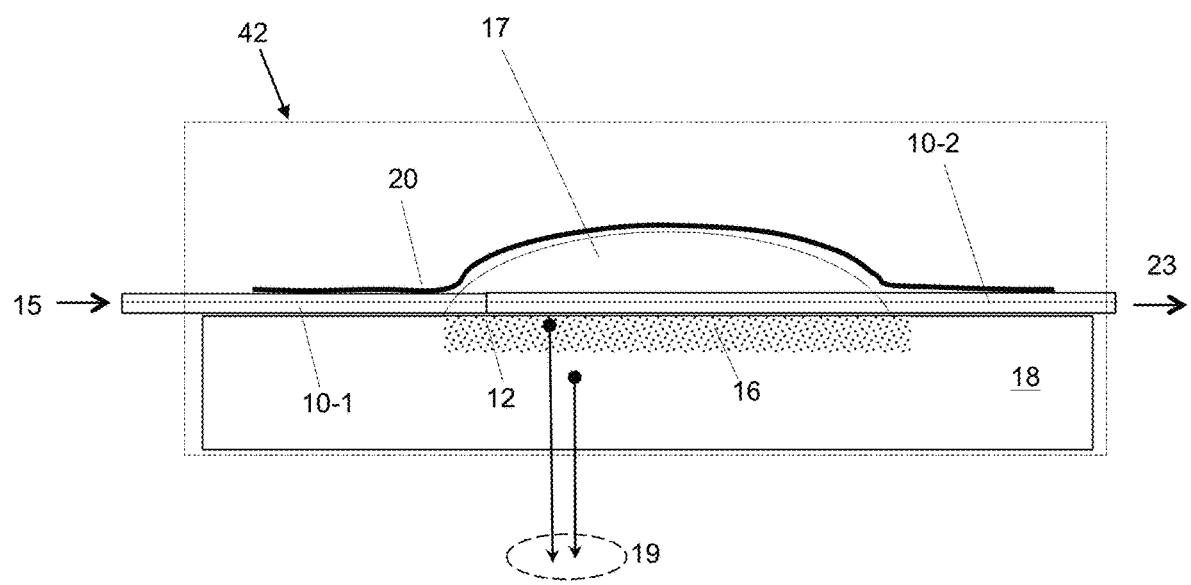
FIG. 5A illustrates an exemplary low loss optical power monitor device with a high index of refraction cladding for efficient out-coupling of light leakage, and a light capturing and redirecting dome element covered by a low index of refraction cap according to exemplary embodiments hereof.

In a further example, as illustrated in the fragmentary view of FIG. 5A, the dome 17 may include a reflective coating 20 overlying at least a portion of its upper curved surface. This coating 20 may, for example, comprise a low temperature evaporated or sputtered gold coating, a white titanium paint coating, and/or other types of coatings or combinations thereof. The reflective coating 20 may improve the coupling efficiency of the leakage light 22 onto the photodiode active area(s) 16. Substantial coupling of light herein refers to greater than 50% of light leakage being absorbed within the active area 16 of the photodetector substrate 18.

Figure 6:
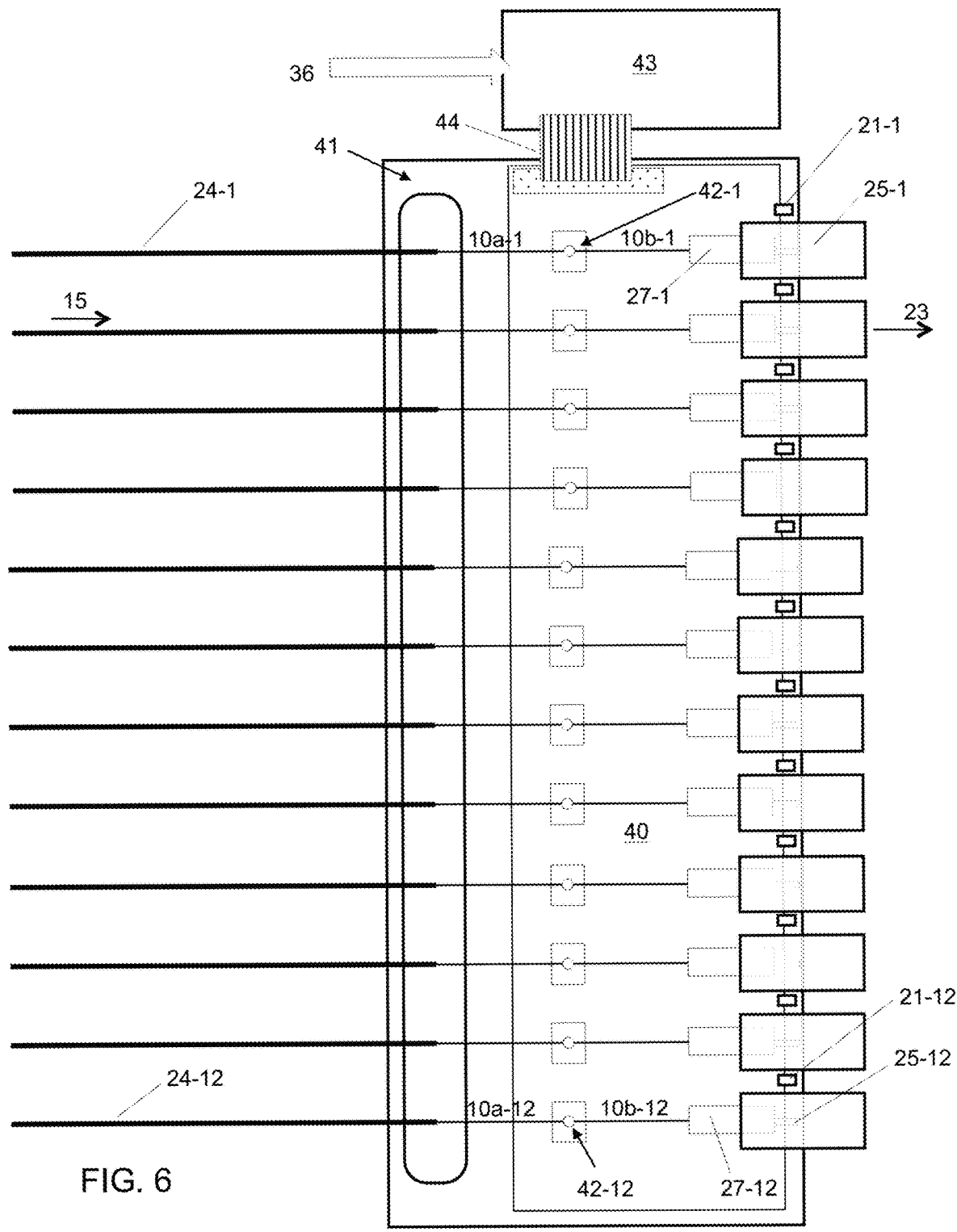
FIG. 6 illustrates a patch-panel tray element according to exemplary embodiments hereof.

In a further example, the dome 17 may be an injection molded plastic part or a hemispherical shaped volume of hardened optical cement with a reflective coating 20 on at least a portion of its top outermost surface. The molded plastic part may be fabricated from a transparent material, such as Polycarbonate, K-Resin, ABS, Acrylic, Polysulfone, or Ultem. The reflective coating may be a low temperature evaporated or sputtered gold or aluminum coating, or alternatively titanium white paint. Other coatings may also be used. The reflective coating 20 may improve the coupling of light onto the photodetector substrate 18 to increase the light collection efficiency to greater than 50% and maximize the signal strength/dynamic range after electronic amplification and digitization by the active electronic circuitry 40, 43, as shown in FIG. 6. The injection molding process for the dome 17 may produce a high consistency of the dome reflector 17 geometry. This pre-fabricated dome structure 17 can be bonded to the photodetector substrate 18 and optical fiber 10 with optical cement (adhesive) 13 having a similar index of refraction to the dome 17, as shown in FIG. 3B. Alternatively, it may be attached by other mechanical means and utilize optical index matching gel instead of adhesive to fill the gaps between the dome 17, the optical fiber 10 and the photodetector substrate 18. This may reduce stray light back-reflections that may otherwise degrade the transmission of optical signals.

Figure 5B:
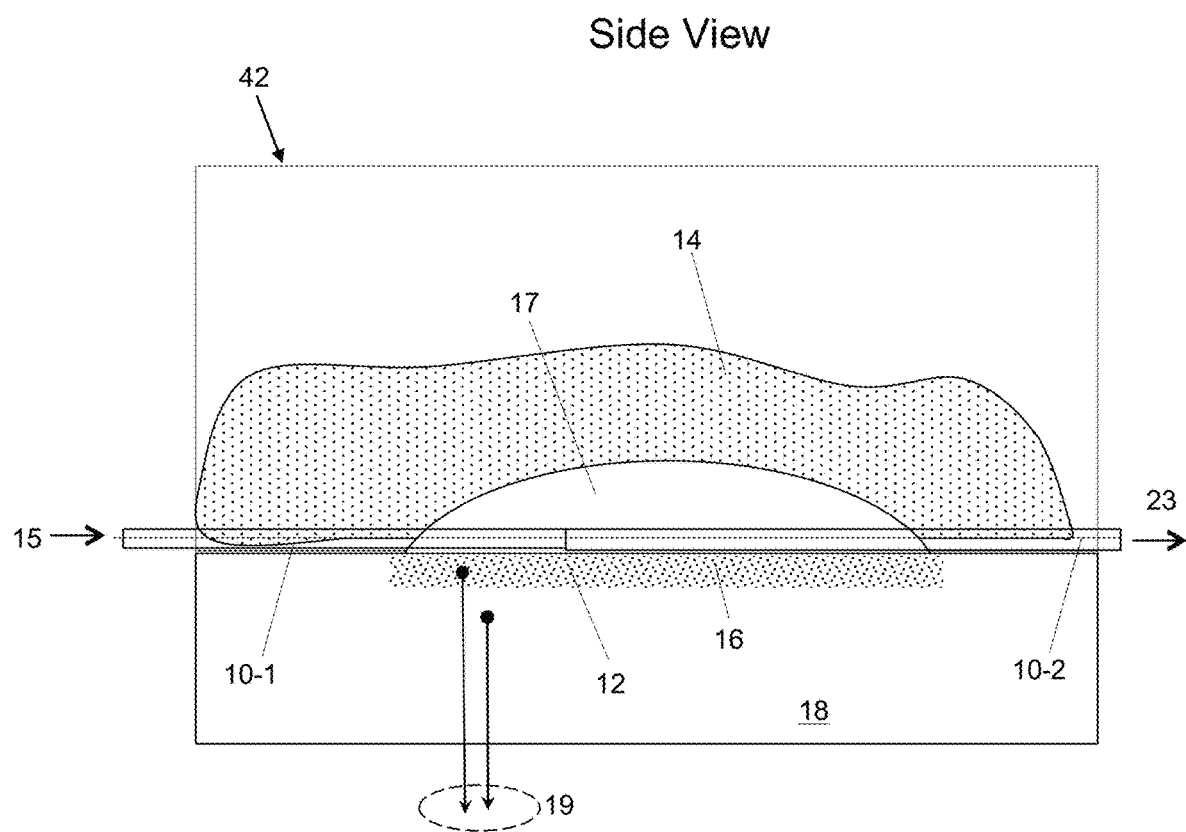
FIG. 5B illustrates an exemplary low loss optical power monitor device with a high index of refraction cladding for efficient out-coupling of light leakage, and a light capturing and redirecting dome element covered by reflective material to assist in directing light onto photodiode according to exemplary embodiments hereof.

In yet another example, referring now to FIG. 5B, a low index of refraction cap or encapsulant 14 may be applied on top of the high index dome 17. This may be in addition to or instead of the reflective coating 20. The index of refraction (n) of the cap 14 may be chosen to be less than 1.40 in this variation. Other indexes of refraction may also be used. As is known in the art, molded polymers such as silicone may have a low index of refraction, typically less than 1.4. Alternatively, a low index coating may be employed.

The lossy junction 12 may be generally centered within the dome 17 or it may be offset relative to the center of the dome 17, such that the light within the core 9 may sufficiently escape the core and expand outside of the cladding at the approximate location the fiber 10 may enter the dome 17. This configuration may potentially increase the coupling efficiency of light 22 onto the active area 16 of the photodetector substrate 18 while allowing the substrate 18 to be miniaturized to <2 mm along the length of fiber.

In a further example, the low index cap 14 above the high index dome 17 may be a molded, optically transparent (at near infrared wavelengths) rigid polymer (e.g. polycarbonate), or a flexible material with low index of refraction (e.g. transparent silicone) and low light absorption. Silicone typically has an index of refraction below 1.4, less than that of an acrylate polymer, for example. Alternatively, the fiber and dome 17 may be encapsulated within a white silicone polymer, to both protect the bare glass optical fiber(s) and to provide a highly reflective interface on the outer surface of the optical cement dome 17.

For near infrared wavelengths (1310 nm, 1550 nm, 1625 nm, etc.), typical photodetectors (e.g., photodiodes) may be fabricated of GaAs, InGaAs, InP, SiGe or Germanium. At 850 nm or visible wavelengths, Si photodiodes can be used instead. In some preferred implementations, the sizes of the active areas 16 range from 0.1 mm to 5 mm in diameter, but other sizes may also be used. Larger sized active areas 16 within this range (e.g., 5 mm) may be advantageous to minimize alignment precision challenges, but may also introduce a tradeoff in terms of cost due to the need for a larger substrate 18.

The index of refraction of the dome 17 may be selected to be suitably high to extract the light from the fiber cladding most efficiently and to direct it into the area surrounding the fiber and ultimately onto the active areas 16 of the photodetector substrate 18. This coupling of the light 22 extracted from the core 9 to the photodetector active area 16 may be achieved with high efficiency and low coupling of leakage 22 back into the fiber segment 10a. The dome's shape advantageously provides relatively large angles of incidence for the leakage signal 22, so that a substantial fraction of the signal 22 may be redirected, or in some cases, focused onto the active areas 16 by total internal reflection. The leakage signal reflected back into the core of fiber segment 10a towards to source of light is termed "back-reflection" and should be maintained at a level of less than −30 dB, preferably less than −50 dB, to avoid degradation of the optical signal fidelity.

Those of ordinary skill in the art will appreciate and understand, upon reading this description, that the dome 17 may be or include any shape or combinations of shapes that may reflect or otherwise redirect the leakage light 22 onto the active area 16 of the photodetector substrate 18. For example, the dome 17 may include a series of generally flat surfaces that may each reflect the leakage light 22 onto the active areas 16. In another example, the dome 17 may be triangular, trapezoidal, or may include a combination of shapes and forms. The dome 17 may also be a lens. It should be understood that the scope of the device and of the dome 17 is not limited in any way by the shape, form, and/or combination of shapes and/or forms that the dome 17 may take.

Multi-Channel Optical Monitors

FIG. 6 illustrates a twelve-fiber patch-panel element or tray 41 with integral, independent optical power monitoring on each fiber according to exemplary embodiments hereof.

Multiple (n>1) optical tap monitor devices 42-1, 42-2 . . . 42-n (individually and collectively 42) (e.g. twelve, twenty-four, etc.) can be incorporated into a single multi-channel printed circuit board assembly, an example of which is illustrated in FIG. 6. A patch-panel thus monitors n input cables, and may include multiple optical tap monitor devices, one for each fiber input cable. In the example in FIG. 6, there are twelve (n=12) fiber input cables (denoted 24-1, 24-2 . . . 24-12) and a corresponding twelve monitor devices 42-1, 42-2 . . . 42-12, where the j-th monitor device 42-*j* monitors the j-th fiber input cable 24-*j*.

Figure 8:
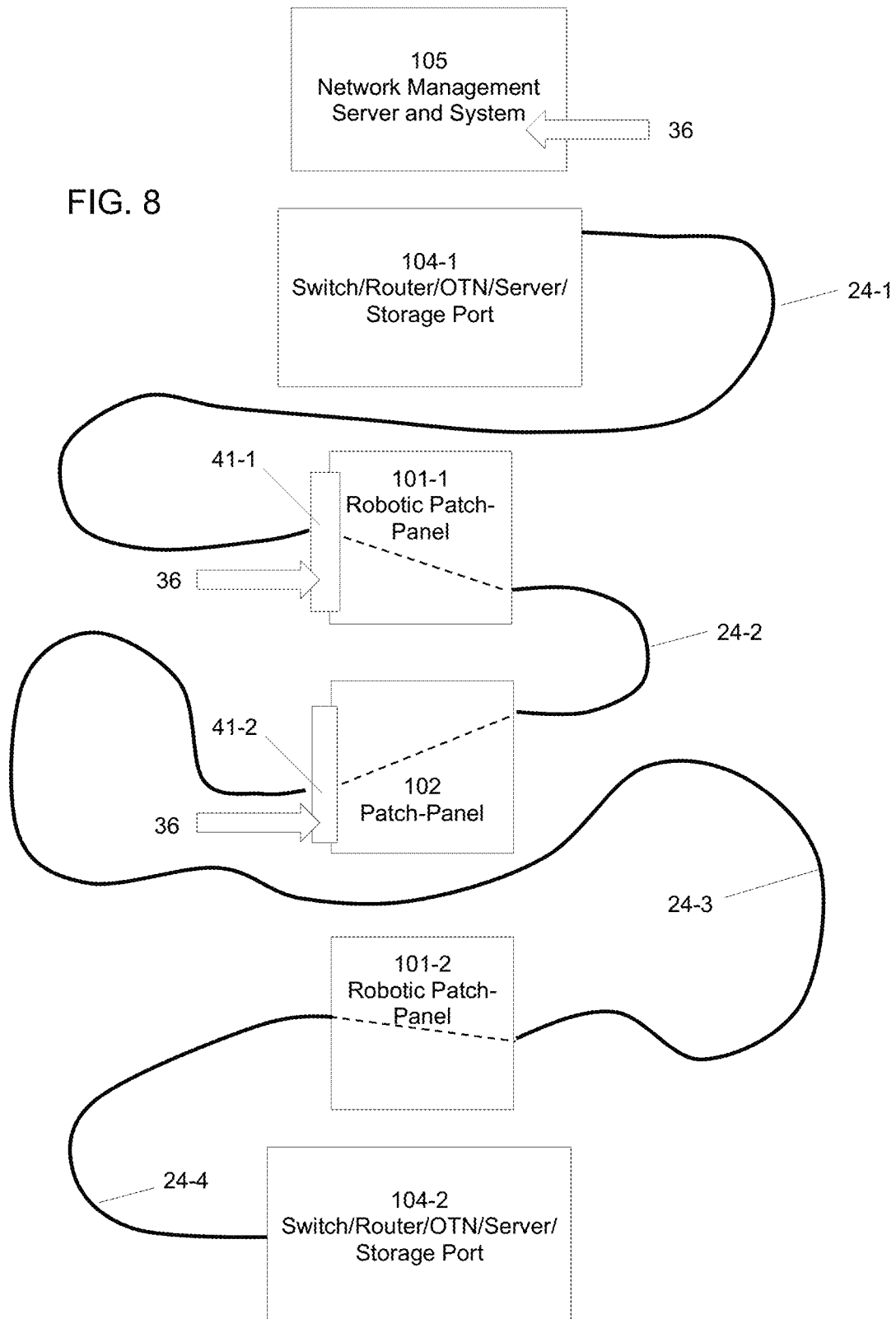
FIG. 8 is a block diagram of a multiplicity of multi-channel optical monitors distributed across a fiber optic network at patch-panels, to provide full telemetry and health monitoring, according to exemplary embodiments hereof.

In the monitor array example of FIG. 6, the low loss optical monitors 42-1 . . . 42-12 may be integrated onto a twelve-channel patch-panel tray 41 (which may be for example a printed circuit board) that can be used in a stacked arrangement as part of a patch-panel functional block 101 or 102, as is shown schematically in FIG. 8. Furthermore, individually controlled LEDs 21-1 . . . 21-12 may be included as visual indicators of ports that may carry optical signals 15-1 . . . 15-12. These sub-assemblies may be combined in a modular fashion into a monitoring system comprised of thousands of channels. Furthermore, the sub-assemblies may be arranged to monitor the multiple channels in near real time and generate alarms indicating light level anomalies in individual channels.

Figure 7:
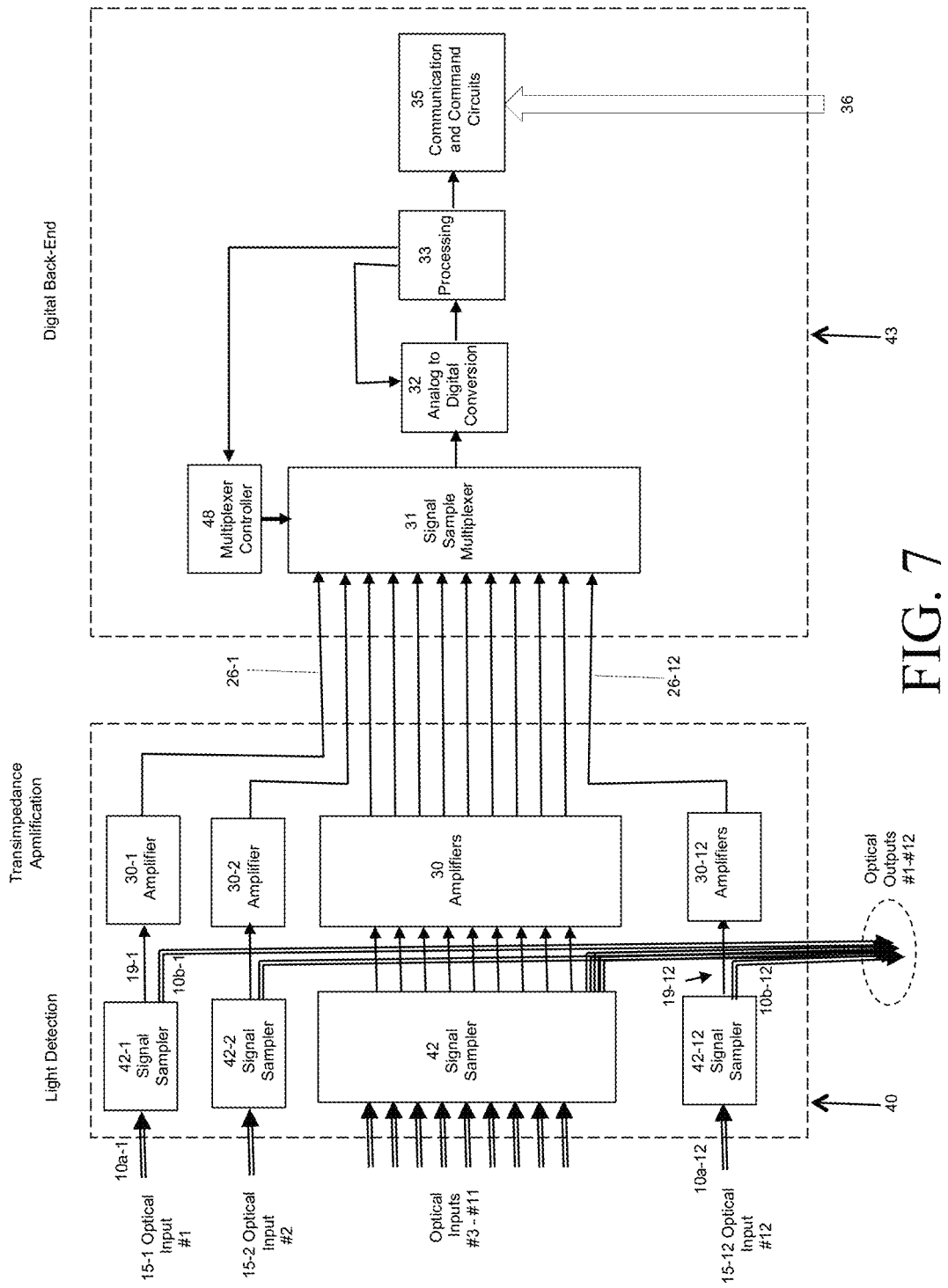
FIG. 7 is a block diagram of an optical monitor system according to exemplary embodiments hereof.

FIG. 7 is a block diagram of an optical monitor system according to exemplary embodiments hereof comprised of multiple fibers (e.g., 96), based on individual 12-channel trays, each tray with an electronic amplifier, multiplexer, analog-to-digital converter, and microcontroller for sampling, analysis, storage and serial communication.

With reference now to FIGS. 6, 7 and 8, embodiments hereof may comprise a modular optical power monitoring system (FIG. 7) comprised of a multiplicity of multi-channel detector subassemblies integrated with electronics (FIG. 6) for data collection and processing, which together constitute a system that monitors the average power through thousands or more optical fibers in near real-time.

This monitoring system may be software configured at one or more management servers 105 (FIG. 8) (or other types of controllers) to, for example, generate alarms upon any detected loss of light. The system is capable of immediately triggering the execution of a predefined failover process and restoring communication after a fiber transmission fault.

The management servers 105 may include software, operating system, scripts, applications, and other types of code and/or information as may be required for the servers 105 to perform their functionalities.

With reference to FIG. 7, an electronic front-end system 40 converts the electrical current 19-1, 19-2 . . . 19-*n* (individually and collectively 19) from each illuminated photodetector within each monitor device 42 into a digitized representation of optical power. For example, the current 19 may be about 5-8 uA per 1 mW average input light signal 15 assuming 1% light leakage at junction 12 and coupling efficiency of about 80%. This electrical signal 19 may be amplified by electronic amplifier 30. These amplified signals are then input to a 1×12 multiplexer 31, which may be controlled to select a channel for digitization by an analog-digital converter (ADC) 32 and a microcontroller 33 to process and transmit optical power level data by a serial, parallel, or Ethernet communication bus 36 (FIG. 6). The system and monitoring functionality are summarized below (with reference to the example shown):

1. Measure light transmitted through each input cable 24-1 . . . 24-12, which corresponds to input optical fibers 10*a*-1 . . . 10*a*-12.

2. If a relative change in optical power of more than a pre-specified level (e.g. 1 dB, 3 dB, etc.) of input signal 15 is detected, the control and management system 105 may generate an alarm indicating potential link degradation. The management system 105 may also execute an automatic process to restore the connection, e.g., by robotically reconfiguring the network.

3. If no light power is detected, the management system 105 may generate an alarm indicating potential link failure.

In the example twelve-channel monitor of FIG. 6, the separate parallel input fiber optic cables 24-1 . . . 24-12 may be closely spaced in the same plane leading up to the patch panel tray 41. At the input position, external insulation may be removed from the cables 24 to expose the bare fiber segments 10*a* on the input side and 10*b* on the output side. The exposed length of bare fiber is integral to each packaged optical signal monitor component 42-1 . . . 42-12 and further includes electrical photodiode output 19 terminals connecting to electronic amplifiers 30 for signal amplification, conversion from current to voltage, and conditioning/noise filtering.

From separate monitor devices 42-1 . . . 42-12, the respective output optical lines 10*b*-1 . . . 10*b*-12 are delivered via individual fiber optic connectors 27-1 . . . 27-12 (e.g. industry standard LC, SC, CS, DC, MU, etc.) to the separate optical fiber connector receptacles 25-1 . . . 25-12, to which external fiber optic cables attached at the far end to transceiver devices on network elements 104 may be connected into the system. At these output points in the system, light-emitting diodes (LEDs) 21-1 . . . 21-12 may be positioned to provide visual indications of those ports carrying optical signals 15. These indicators may guide and alert technicians to active links.

Independent but interrelated multi-channel units 41 are each comprised of multiple (e.g. 12) signal samplers 42-1 . . . 42-12, each of which may be of the form depicted in FIGS. 1A-5. Electronic detection circuitry as depicted in the block diagram of FIG. 7 may convert the light leakage signals 22 into electrical signals 19-1 . . . 19-12, and with additional circuitry 31, 32, 33, 35 create a digital representation of the optical power levels of the transmitted signals 15-1 . . . 15-12. This data may be transmitted, for example, through an Ethernet interface 36 to a management server 105. Each multi-detector assembly 41 includes an optical monitor front end 40 and digital back end circuitry 43 resident on the tray 41, or attached separately thereto through electrical connector 44.

The twelve individual monitor elements 42-1 . . . 42-12 of this example are each responsive to the small signals extracted from input optical fibers 10*a*-1 . . . 10*a*-12, with the larger fraction of light continuing on and propagating through output fibers 10*b*-1 . . . 10*b*-12 to outputs 23. The internal structure and operation of signal samplers 42 are detailed above. The signal fractions generated (which may be of zero or very low amplitude in the event of component failure in whole or part) by the monitors 42 are first passed through individual amplifiers 30, then the amplified electronic signals 26-1 . . . 26-12 are input to a twelve-channel electronic multiplexer 31. Short duration signal samples (<5 seconds each) from the separate channels, as selected by a conventional electronic multiplexer controller 48, are sequentially transferred to output line of multiplexer 31 for conversion to a digital signal by the analog to digital converter 32. These digital signals may be processed and scaled by the processing unit 33, then communicated to a digital, serial, parallel or Ethernet communication bus 36 by communication circuits 35 for data transmission under system command.

Each individual signal sample may be analyzed, optionally stored and transferred as desired by the communication and command circuit 35 to the management server 105 through, for example, the Ethernet interface 36. Thus, for each multi-channel (here 12 channels) set of sensors, a corresponding time multiplexed set of outputs may be provided to the communication and command circuits 35. With rapid sensing and sampling of each channel, a multitude of channels can be continuously monitored. As previously described, the number of channels being continuously monitored can be increased or decreased, temporarily or continuously, at the option of the system operator. It should be understood that any number of channels may be configured and monitored by the system at any time. The duration of individual channel scanning and signaling is widely variable in accordance with system requirements.

The unique attributes of this detector element 42, namely its low insertion loss, low back-reflection, low cost and small size, enable optical power to be measured throughout the network in a non-invasive fashion, so that networks such as the one shown schematically in FIG. 8 can be instrumented for high performance and high reliability. This detector component enables advanced self-monitoring and self-diagnosing network architectures to be realized in mobile networks and data centers, to improve operational efficiencies and service quality/response. Accordingly, an automated network management system is disclosed herein with the integral optical monitors 42 associated with each fiber optic interconnection, for example, those at robotic patch-panels 101-1, 101-2 and manual patch-panels 102, to create monitored interconnections between distributed network equipment 104.

This exemplary twelve-fiber patch-panel tray element 41 with integral, independent optical power monitoring on each fiber optic cable 24-1 . . . 24-4 is meant for demonstration, and the tray 41 may be modular and can scale the system to monitor thousands of channels in real time. Optical monitor power readings are communicated back to the one or more network management servers 105 on which a distributed network management software system may reside. Each subsystem patch-panel tray 41 independently performs the detection, multiplexing, and digitization. In this manner, optical power measurements are performed automatically and remotely even for large-scale networks, eliminating the need for costly manual labor and reducing the risk of errors.

Those skilled in the art will readily observe that numerous modifications and alterations of the device may be made while retaining the teachings of the invention. Accordingly, the above disclosure should be construed as limited only by the metes and bounds of the appended claims.

Conclusion

As used herein, the term "significant fraction" means more than half.

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

It will be appreciated that variations to the foregoing embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

LEGEND

9: Optical fiber core
10: Optical fiber
11: Optical fiber cladding
12: Lossy junction
13: Optical adhesive
14: Low index cap
15: Input optical signal
16: Photodetector active area
17: Dome
18: Photodetector substrate
19: Electrical signal
20: Highly reflective coating
21: Light emitting diode (LED)
22: Leakage light rays
23: Output, transmitted optical signal
24: Fiber optic cable
25: Optical fiber connector receptacle 26: Amplified electrical signal
27: Fiber optic connector (e.g. LC, SC, etc.)
30: Electronic amplifier
31: Electronic multiplexer
32: Analog to digital converter
33: Electronic processing circuit
35: Communication and command circuit
36: Communication interface
40: Optical monitor front end
41: Patch-panel tray
42: Fiber optic monitoring assembly
43: Digital electronics back end
44: Electrical connector
48: Electronic multiplexer controller
101: Robotic patch-panel
102: Manual patch-panel
104: Network elements
105: Network management server and system

I claim:

1. A low loss power monitor device for an optical fiber light transmission system comprising:
a length of optical fiber transferring an optical signal within a core and cladding geometry, said length comprising serial optical fiber segments engaged end to end by a lossy junction, wherein a fraction of signal energy of the optical signal is deflected laterally thereat;
a dome segment of higher index of refraction material than the optical fiber core encompassing the length of optical fiber including the lossy junction on one side thereof and having a convex reflective surface positioned to reflect light from the lossy junction back toward a second side of the fiber length; and
a photodiode body positioned on the second side of the dome segment in contact with a span of fiber including the lossy junction and responsive to a light fraction reflected from the dome segment.

2. The power monitor device as set forth in claim 1, wherein the lossy junction is a fusion device and a fraction loss of the reflected light is in the range of 0.1 dB to 1.0 dB.

3. The power monitor device as set forth in claim 1, wherein the dome segment has a bottom coextensive with a linear portion of the optical fiber length, and wherein the dome segment is in planar engagement with the photodiode body.

4. The power monitor device as set forth in claim 3, wherein the dome segment has a substantially flat bottom.

5. The power monitor device as set forth in claim 1, wherein the device comprises a highly reflective coating over the convex surface of the dome segment.

6. The power monitor device as set forth in claim 1, wherein the dome segment comprises a UV cure optical cement and has a curvature providing relatively large angles of incidence for light internally reflected toward the photodiode.

7. A multi-channel optical system for ascertaining an operative status of individual optical circuits in a given multiplicity of different optical fiber circuits arranged in separated control paths, the system comprising:
separate individual signal extracting devices in each of said control paths, in separated segments of optical fibers, each fiber having a separate core junction excision laterally emitting less than above 1% of the signal conveyed along the fiber, each signal extracting device including an emission responsive photodiode body having an active area in contact with the junction on one side of the junction, and a photo reflector substantially encompassing a remainder of the junction and directing the laterally emitted signal onto the photodiode; and
an optical signal multiplexer having at least one output and multiple inputs, each input separately receiving a signal input from a different one of the photodiodes, wherein absence of a signal in a control path indicates transmission failure.

8. The system of claim 7, wherein the control paths comprise separated parallel control paths.

9. The system of claim 7, wherein the segments of optical fibers are laterally separated substantially parallel segments.

10. The system of claim 7, wherein the photo reflector comprises optical cement being configured in a particular shape.

11. The system of claim 10, wherein the particular shape comprises a partial dome shape.

12. The system of claim 11, wherein the particular shape is covered with a highly reflective coating.

13. The system of claim 7, wherein the signal extracting devices comprise junctions between opposed optical fiber segment ends of less than 5 mm in length.

14. The system of claim 13, wherein the photo reflector comprises a body enveloping each lateral junction, wherein said body is less than about 20 mm$^3$ in volume.

15. The system of claim 14, wherein the body enveloping each lateral junction comprises a higher refractive index above the junction and a signal detecting photodiode below the junction.

16. The system of claim 7, wherein the optical system further comprises a scanning system responsive to the signal multiplexer for and providing de-multiplexed output signals indicating amplitudes of the individual signals from the different photodiodes.

17. The system of claim 7, wherein the multiplexer has a single output.

18. The system of claim 7, wherein the optical system further comprises a scanning system responsive to the signal multiplexer providing de-multiplexed output signals indicating amplitudes of the individual signals from the different photodiodes.

19. A circuit system for continuously monitoring power levels in individual ones of a plurality of optical fiber channels disposed in multi-channel sets, the system comprising:
a variable plurality of optical signal sensors, each positioned individually in a different one of the optical fiber channels, each signal sensor comprising a core discontinuity between abutting ends of paired optical fibers, each said discontinuity introducing less than about 1.0 dB of energy leakage loss in the signal being transmitted in the fiber, the signal sensors each also including individual optical energy reflectors spanning the core discontinuity on one lateral side of the fiber, and a signal detector spanning the core discontinuity on the opposite lateral side thereof to sense optical energy leaked therefrom, the signal detector comprising a photodiode having an active area in contact with a span of the fiber that includes the core discontinuity; the multi-channel sets being substantially alike in number;
a plurality of different energy leakage signaling circuits, each coupled and responsive to the signals emanating from the sensors of a different one of the multi-channel sets and a scanner to serially scan multiple sensors of the associated set to output then-existing signal levels in the associated sets, each of the signaling circuits including a multiplexor to multiplex the sensors in the multi-channel sets; and a processor system coupled to control the scanning of the signaling circuits and to process one output from the energy leakage signaling circuits.

20. The system of claim 19, wherein the discontinuities along the fiber lengths each further comprise volumes defined by dome-shaped optical reflectors individually spanning one side of the core discontinuity and wherein said optical reflectors have a higher index of refraction within their dome-shaped volumes than the optical fiber claddings, and the signal detectors each comprise a photodiode body providing an output signal responsive to the loss at the discontinuity.

\* \* \* \* \*